US008819335B1

(12) United States Patent
Salessi et al.

(10) Patent No.: US 8,819,335 B1
(45) Date of Patent: Aug. 26, 2014

(54) SYSTEM AND METHOD FOR EXECUTING MAP-REDUCE TASKS IN A STORAGE DEVICE

(71) Applicant: NXGN Data, Inc., Irvine, CA (US)

(72) Inventors: Nader Salessi, Laguna Niguel, CA (US); Joao Alcantara, Irvine, CA (US)

(73) Assignee: NXGN Data, Inc., Irvine, CA (US)

( * ) Notice: Subject to any disclaimer, the term of this patent is extended or adjusted under 35 U.S.C. 154(b) by 0 days.

(21) Appl. No.: 14/015,815

(22) Filed: Aug. 30, 2013

(51) Int. Cl.
  *G06F 12/02* (2006.01)
  *G06F 3/06* (2006.01)
  *G06F 17/30* (2006.01)
(52) U.S. Cl.
  CPC .......... *G06F 12/0246* (2013.01); *G06F 3/0679* (2013.01); *G06F 17/30321* (2013.01)
  USPC .......................................... 711/103; 711/147
(58) Field of Classification Search
  CPC ....... G06F 9/50; G06F 9/5005; G06F 9/5083; G06F 12/0246; G06F 3/0679; G06F 17/30321; G06F 17/30324; G06F 3/0683
  USPC ........................... 711/103, 147; 718/104, 105
  See application file for complete search history.

(56) References Cited

U.S. PATENT DOCUMENTS

| | | | |
|---|---|---|---|
| 7,650,331 B1 | 1/2010 | Dean et al. | |
| 8,549,518 B1 * | 10/2013 | Aron et al. | ......................... 718/1 |
| 2012/0297145 A1 | 11/2012 | Castillo et al. | |
| 2013/0151443 A1 * | 6/2013 | Kyaw et al. | ..................... 706/12 |
| 2013/0263142 A1 * | 10/2013 | Miyamae | ..................... 718/102 |

* cited by examiner

*Primary Examiner* — Than Nguyen
(74) *Attorney, Agent, or Firm* — Christie, Parker & Hale, LLP

(57) ABSTRACT

A system and method of providing enhanced data processing and analysis in an infrastructure for distributed computing and large-scale data processing. This infrastructure uses the Hadoop™ framework to divide an application into a large number of small fragments of work, each of which may be performed on one of a large number of compute nodes. The work may involve map tasks and reduce tasks which may be used to categorize and analyze large amounts of data in distributed systems. This infrastructure includes a cluster with a master node and a plurality of slave nodes. The slave nodes may include, or may be, intelligent solid-state drives capable of executing Map-Reduce functions. The use of intelligent solid-state drives reduces the need to exchange data with a CPU in a server.

10 Claims, 12 Drawing Sheets

SYSTEM AND METHOD FOR EXECUTING MAP-REDUCE TASKS IN A STORAGE DEVICE

FIELD

The following description relates to cloud data storage systems and more particularly to a system and method for efficiently executing Map-Reduce tasks on large volumes of data, and on data stored in master-slave hardware configurations.

BACKGROUND

Every day, several quintillion bytes of data may be created around the world. These data come from everywhere: posts to social media sites, digital pictures and videos, purchase transaction records, bank transactions, sensors used to gather data and intelligence, like climate information, cell phone GPS signal, and many others. This type of data and its vast accumulation is often referred to as "big data." This vast amount of data eventually is stored and maintained in storage nodes, such as hard disk drives (HDDs), solid-state storage drives (SSDs), or the like, and these may reside on networks or on storage accessible via the Internet, which may be referred to as the "cloud." This stored data may also require processing, or be subject to operations, such as during a search, Pattern Mining, Classification, or other processes. Typically, a processing device, such as a central processing unit (CPU), in a server performs operations on the data. The data is read from the storage node, processed by the CPU and the processed data is sent to the source of a request and/or stored back on the storage node. Standard storage nodes generally do not include computational resources to perform such operations on data stored in the storage node.

Moreover, standard storage node interfaces, such as Serial Advanced Technology Attachment (SATA), Fibre Channel, or Serial Attached SCSI (SAS), do not define commands to trigger the storage node to perform data operations in the storage node. Accordingly, operations are performed outside of the storage node, e.g., in a server CPU. To perform such an operation, a server uses standard read and write commands supported by existing storage node interfaces to move data from and to the storage node. Specifically, the server sends a standard read command to the storage node via a bus. The storage node then sends the stored data over the bus to the server, which typically holds the data in its main memory. The CPU of the server then performs operations on the data to produce a result. Depending on the type of operation, the server provides the result to a requesting source and/or stores the result on the storage node.

There are several disadvantages associated with this process of reading the data from the storage node, and processing the data within the server, and potentially storing the processed data back on the storage node. Because of these disadvantages, the process of performing data operations on the server is referred to as "costly" or "expensive" in terms of device performance and power consumption. Because the server CPU is involved in every step of the process, this process occupies the CPU of the server, consumes power, blocks other user operations that otherwise could have been performed, and requires that the server contain a buffer, or a larger buffer than would otherwise be needed. The buffer is typically the main memory of the CPU, or double data rate (DDR) random access memory. This process also ties up the communication bus between the server and the storage node since data is sent from the storage node to the server and then back to the storage node. In other words, existing processes for searching and analyzing large distributed unstructured databases are time-consuming and use large amounts of resources such as CPU utilization, memory footprint, or energy.

In summary, typical operations like search, pattern mining, classification, machine learning algorithms and data analysis are, in existing systems, performed on the local server's CPU. Search and processing may be performed over the entire data residing in storage nodes (e.g., solid state drives (SSDs), hard disk drives (HDDs), etc.) within the server. Data needs to be moved from the storage node into the CPU memory where it can then be processed. This is inefficient, e.g., slow, because a single server CPU, which may control a large collection of storage nodes, has relatively little processing power with which to process the large volume of data stored on the collection of storage nodes. Efficiency may also be compromised by one or more data bottlenecks between the server CPU and the storage nodes. Moreover, requiring the server's CPU to do this work makes inefficient use of energy as well, in part because a general-purpose CPU like a server CPU generally is not optimized for large data set processing, and in part because transferring data over a data bus and across the interface to the storage node requires a significant amount of power.

Big data may be managed and analyzed using the Hadoop™ software framework and using the Map-Reduce programming model. The Hadoop™ framework may implement Map-Reduce functions to distribute the data query, which may be a Map-Reduce job, into a large number of small fragments of work, referred to herein as tasks, each of which may be performed on one of a large number of compute nodes. In particular, the work may involve map tasks and reduce tasks which may be used to categorize and analyze large amounts of data in distributed systems. As used herein, a compute node is a piece of hardware capable of performing operations, and a storage node is a piece of hardware capable of storing data. Thus, for example, a piece of hardware may be, or contain, both a compute node and a storage node, and, as another example, a compute node may include or contain a storage node.

Related art Map-Reduce systems for large-scale processing of data in a parallel processing environment include one or more map modules configured to read input data and to apply at least one application-specific map operation to the input data to produce intermediate data values. An intermediate data structure stores the intermediate data values. These systems also include reduce modules, which are configured to retrieve the intermediate data values from the intermediate data structure and to apply at least one user-specified reduce operation to the intermediate data values to provide output data. Preferably, the map and/or reduce tasks are automatically parallelized across multiple compute nodes in the parallel processing environment. The programs or instructions for handling parallelization of the map and reduce tasks are application independent. The input data and the intermediate data values can include key/value pairs and the reduce operation can include combining intermediate data values having the same key. The intermediate data structure can include one or more intermediate data files coupled to each map module for storing intermediate data values. The map and reduce tasks can be executed on different compute nodes. The output data can be written to the local storage node or to another compute node using a distributed file system, for instance, a Hadoop™ distributed file system (HDFS).

Map-Reduce (M-R) is a programming model that allows large amounts of data to be processed on parallel computer platforms using two basic functions: map and reduce. Data is first mapped (for grouping purposes) using the map function and then reduced (aggregated) using the reduce function. For example, records having different attributes such as "dog" and "cat" could be mapped, for grouping purposes, to new records (or tuples) where each has attributes of "animal" instead of "dog" or "cat". Then, by a reduce function, all the "animal" records (or tuples) could be aggregated. A Map-Reduce model implemented in a parallel processing computer system may enhance the processing of massive quantities of data by a "divide-and-conquer" strategy that may result from dividing the data into portions and processing it on parallel-processing computer installations.

Related art hardware systems may include a set of data nodes, which may also be referred to as slave nodes, controlled by a master node which may also be referred to as a job tracker or name node. Within the Hadoop™ framework, the master node may use the Map-Reduce process to assign tasks to slave nodes, the slave nodes may complete the tasks, and the master node may then aggregate the results produced by the slave nodes.

The master node and the slave nodes may be servers, each including a CPU and a storage node. As in the case of other operations, slave node sub job operations executed in a CPU which retrieves data from a storage node and may save results on a storage node are relatively slow and power-inefficient. Thus, there is a need for a system and method, in, e.g., a Hadoop™ system, for more efficiently processing data stored on storage nodes.

SUMMARY

Aspects of embodiments of the present disclosure are directed toward a system and method of providing enhanced data processing and analysis in a cluster of compute nodes executing Map-Reduce tasks in a Hadoop™ framework. Hadoop™ framework divides a data query (Map-Reduce job) into a large number of small fragments of work, each of which may be performed on one of a large number of compute nodes. The work may involve a map task and a reduce task which may be used to categorize and analyze large amounts of data in distributed systems. A Hadoop™ cluster contains a master node and a plurality of slave nodes. The slave nodes include intelligent solid-state drives capable of executing Map-Reduce tasks. The use of intelligent solid-state drives reduces the need to exchange data with a CPU in a server.

According to an embodiment of the present invention there is provided an intelligent solid state drive including: a processing unit; and a flash memory; the processing unit configured to be in communication with the flash memory, and including: a hardware engine; and a microcontroller; the solid state drive configured to perform map and reduce tasks.

In one embodiment, the intelligent solid state drive is configured to run an operating system.

In one embodiment, the operating system is configured to enable the drive to execute a high-level computer language.

In one embodiment, the computer language is an object-oriented programming language.

In one embodiment, the cluster includes a cluster of nodes, the cluster of nodes including: a master node; and a plurality of slave nodes; wherein a slave node of the plurality of slave nodes includes a server including a server central processing unit (CPU) and an intelligent solid state drive.

In one embodiment, the cluster includes a cluster of nodes, the cluster of nodes including: a master node; and a plurality of slave nodes; wherein a slave node of the plurality of slave nodes is an intelligent solid state drive.

In one embodiment, the plurality includes a master node and a plurality of slave nodes, a slave node of the plurality of slave nodes including an intelligent solid state drive, the method including: submitting the query to the master node; assigning a plurality of tasks to the plurality of slave nodes, by the master node, the plurality of tasks being configured to execute portions of the query; executing the plurality of tasks, by the plurality of slave nodes; returning the results of the execution of the plurality of tasks, by the plurality of slave nodes, to the master node; and aggregating, by the master node, the results of the execution of the plurality of tasks.

In one embodiment, the method includes assigning of a task by a first slave node of the plurality of slave nodes to a second slave node of the plurality of slave nodes.

In one embodiment, a task of the plurality of tasks includes an execution of a map function within a Map-Reduce framework.

In one embodiment, a task of the plurality of tasks includes an execution of a reduce function within a Map-Reduce framework.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION

The detailed description set forth below in connection with the appended drawings is intended as a description of exemplary embodiments of a system and method for performing efficient data operations and analytics provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

The present invention relates to systems and methods for processing data in large systems using solid state storage. According to an embodiment of the present invention, processing of data stored on an intelligent solid state storage node, which may be referred to as an intelligent solid state drive (SSD), does not require comparatively slow reading and re-writing of the data and, instead, is accommodated by performing the processing within the intelligent SSD.

Comparable SSDs typically include a controller for facilitating the transfer of data to and from the SSD. The CPU in a typical comparable SSD has limited processing capability, which is an obstacle to running an operating system and to running Java™. It also lacks a hardware engine for performing a word count or pattern matching.

Figure 1:
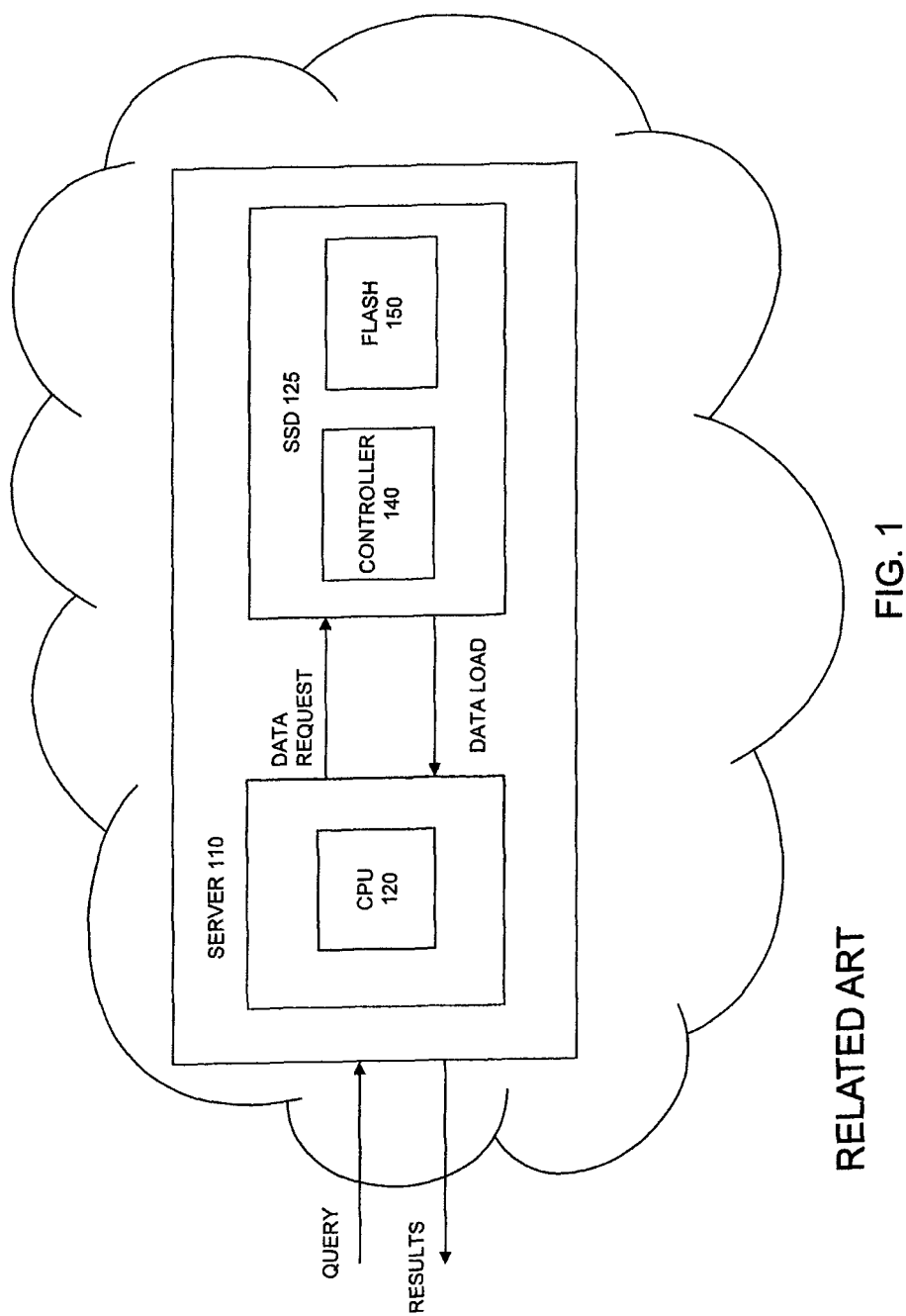
FIG. 1 shows an exemplary block diagram depicting a solid state drive in communication with a server, in accordance with related art systems.

FIG. 1 is a block diagram of a system which includes a server 110 in communication with a storage node for performing data queries according to prior art implementations. FIG. 1 includes a server 110, which can include a processor, such as a server central processing unit (CPU) 120, and a comparable SSD 125, which can include a storage node controller 140 and a non-volatile memory, e.g., a flash memory 150. The server 110 and comparable SSD 125 may be implemented in a cloud-based computing environment. The server 110 and comparable SSD 125 may communicate using any storage buses as well as PCIe with any protocol which runs on it. In other embodiments storage nodes may be connected to, and controlled by, a host CPU which need not be a server CPU but may be a CPU in an application not configured as a server. Thus a server CPU may be an example of a host CPU.

As used herein, the phrase "in communication with" refers to in direct communication with or in indirect communication with via one or more components named or unnamed herein. The server 110 and the comparable SSD 125 can be in communication with each other via a wired or wireless connection. For example, in one embodiment, the comparable SSD 125 may comprise pins (or a socket) to mate with a corresponding socket (or pins) on the server 110 to establish an electrical and physical connection. In another embodiment, the comparable SSD 125 can comprise a wireless transceiver to place the server 110 and the comparable SSD 125 in wireless communication with each other. The server 110 and comparable SSD 125 may be separately housed from each other, or contained in the same housing.

As shown in FIG. 1, in operation, the server 110 may receive a query, which may, for example, entail finding the number of occurrences of a certain pattern or text. As used herein, a pattern is a combination of strings and logical operations, in which the logical operations determine which combinations of the strings, if they are found in a set of data, will constitute a match for the pattern in the set of data. In response, the server 110 may send a data request to the comparable SSD 125. The comparable SSD 125 receives the data request, and retrieves the requested data. The comparable SSD 125 then sends the data to the server 110. The server CPU 120 processes the data and returns the results. The server 110 and the comparable SSD 125 may include additional components, which are not shown in FIG. 1 to simplify the drawing.

In one embodiment of the present invention and referring to FIG. 2, an intelligent SSD 130 may have the capabilities of a comparable SSD 125 in addition to further capabilities discussed in detail below. Thus, an intelligent SSD 130 may be used in applications in which a comparable SSD 125 might otherwise be used, such as those described above with respect to FIG. 1.

Figure 2:
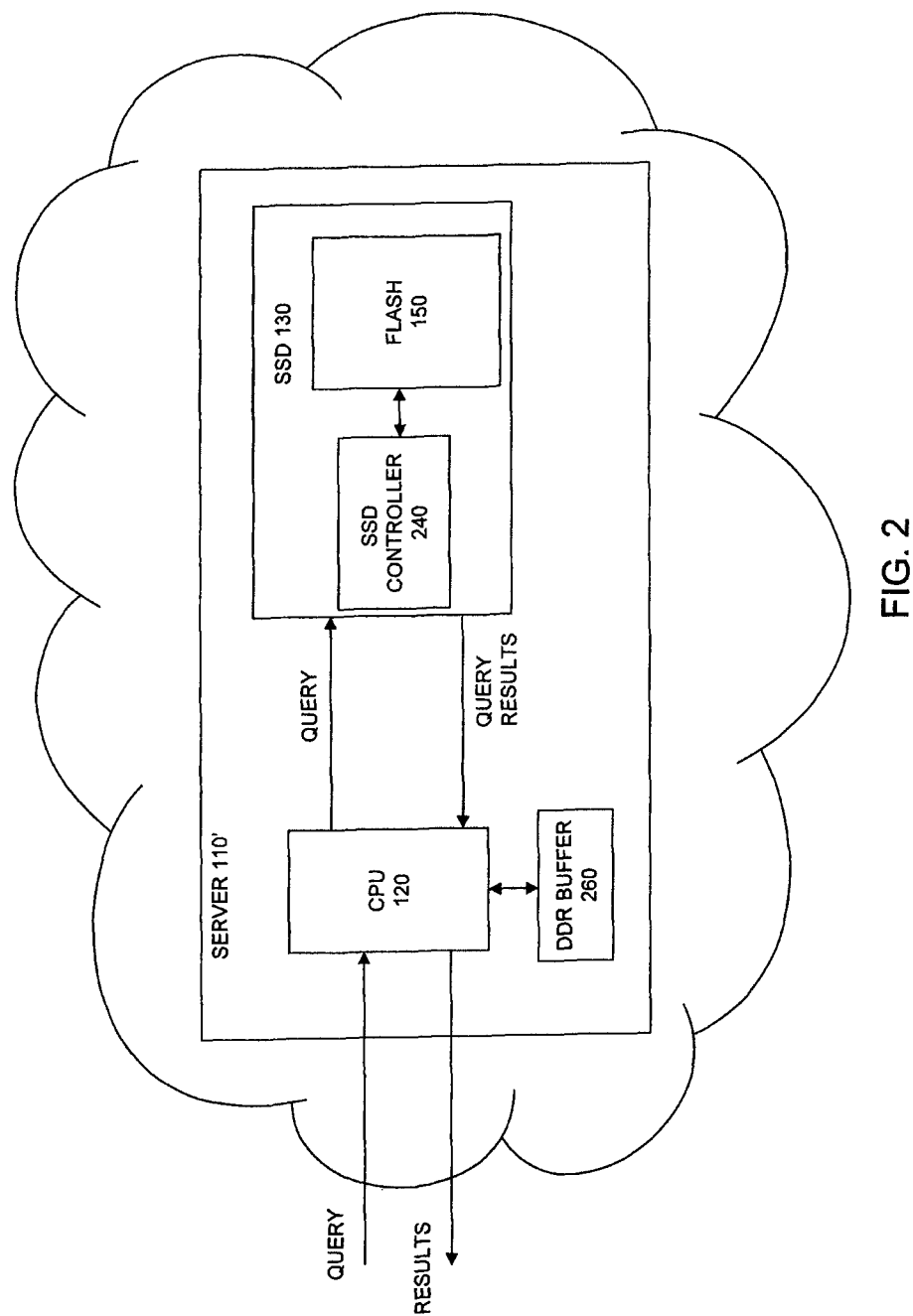
FIG. 2 depicts an exemplary block diagram of a solid state drive in communication with a server, in accordance with an embodiment of the present invention.

In particular and as shown in FIG. 2, a server 110' may include a processor, such as a server central processing unit (CPU) 120, and an intelligent SSD 130. The server 110' and intelligent SSD 130 may be implemented in a cloud-based computing environment. The server 110' and intelligent SSD 130 may communicate using any storage buses as well as PCIe with any protocol which runs on it. In other embodiments storage nodes may be connected to, and controlled by, a host CPU which need not be a server CPU but may be a CPU in an application not configured as a server.

The server 110' and the intelligent SSD 130 can be in communication with each other via a wired or wireless connection. For example, in one embodiment, the intelligent SSD 130 may comprise pins (or a socket) to mate with a corresponding socket (or pins) in the server 110' to establish an electrical and physical connection with, e.g., the CPU 120. In another embodiment, the intelligent SSD 130 can comprise a wireless transceiver to place the server 110' and the intelligent SSD 130 in wireless communication with each other. The server 110' and the intelligent SSD 130 may be separately housed from each other, or contained in the same housing.

As shown in FIG. 2, in operation, the server 110' may receive a query, described by map and reduce functions, which may, for example, entail finding the number of occurrences of a certain pattern or text. As used herein, a pattern is a combination of strings and logical operations, in which the logical operations determine which combinations of the strings, if they are found in a set of data, will constitute a match for the pattern in the set of data. In response, the server 110' may send a data request to the intelligent SSD 130. The intelligent SSD 130 receives the data request, and retrieves the requested data. The intelligent SSD 130 then sends the data to the server 110'. The server CPU 120 processes the data and returns the results.

FIG. 2 is a block diagram of a system which includes a server 110' containing, and in communication with, an intelligent SSD 130 for performing data queries according to aspects of the present disclosure. The server 110' and intelligent SSD 130 may be part of a cloud-based computing environment, a network, or a separate subsystem. The server may also contain a server CPU 120, and a data buffer 260, which may be composed of DDR memory.

According to aspects of the present disclosure, the intelligent SSD 130 includes an SSD controller 240 that is designed for data operations or analytics, such as search and analysis of a large volume of unstructured data. The SSD controller 240 can include, for example, a reconfigurable digital signal processing (DSP) core containing arithmetic and logic units and other dedicated hardware units that may be used to perform data analytics, and other operations such as compression, decompression, encryption, and decryption. In one embodiment, the intelligent SSD 130 includes an ARM-based core or any other suitable CPU. These additional cores and circuitry within the silicon of the SSD controller 240 occupy a small area and as a result consume little power. Although these functions could also be performed on a server CPU, transferring data over a data bus and across the interface to the storage node requires a significant amount of power. By designing and/or integrating the silicon of the SSD controller 240 to perform the desired functions, their execution can be made significantly more power-efficient. The intelligent SSD 130 may include an SSD controller 240 and a flash memory 150.

In one embodiment, the SSD controller 240 performs querying of data. For example, a Map-Reduce job may be composed of a request to find a text word, and/or the number of occurrences of that text word in the storage nodes in the server. According to aspects of the present disclosure, instead of reading contents of the storage node into the server CPU and counting the number of matches, the task can be computed locally within the storage node. The server 110' may be configured to receive queries. When the server (also referred to as the data node) receives a query, the server passes the query to the storage nodes in the server. Each of these storage nodes, which may be SSDs, may then process the query and return the results to the server, which may compile them. While this process is illustrated with reference to a query, described by Map-Reduce functions, a similar process enables data analytics, machine learning algorithms, and other such operations to be performed on the SSD controller 240.

A query may include pattern matching, word count or occurrence counting. In both pattern matching and occurrence counting, the data are searched for matches to one or more specified patterns; in pattern matching, the matching data are returned whereas in occurrence counting only the number of matches is returned. In addition to pattern matching, word count, and occurrence count, the SSD controller 240 may run a Java™ engine. The ability to run a Java™ engine on the SSD controller 240 may enable the SSD controller 240 to participate in a Hadoop™ system and to execute map and reduce tasks. It may also enable the storage node to perform more complex operations in response to communications supported by standard storage node interfaces. The ability to run Java™ requires a higher performance CPU and may require an operating system. The unused portion of the SSD controller 240 may be used for running the operating system and Java™ for high level operation. Other operations, such as counting the number of occurrences of a string in the SSD data, for which high speed execution at low power consumption is important, may be performed by purpose-designed processing elements or by a DSP core in the SSD controller 240.

Figure 3:
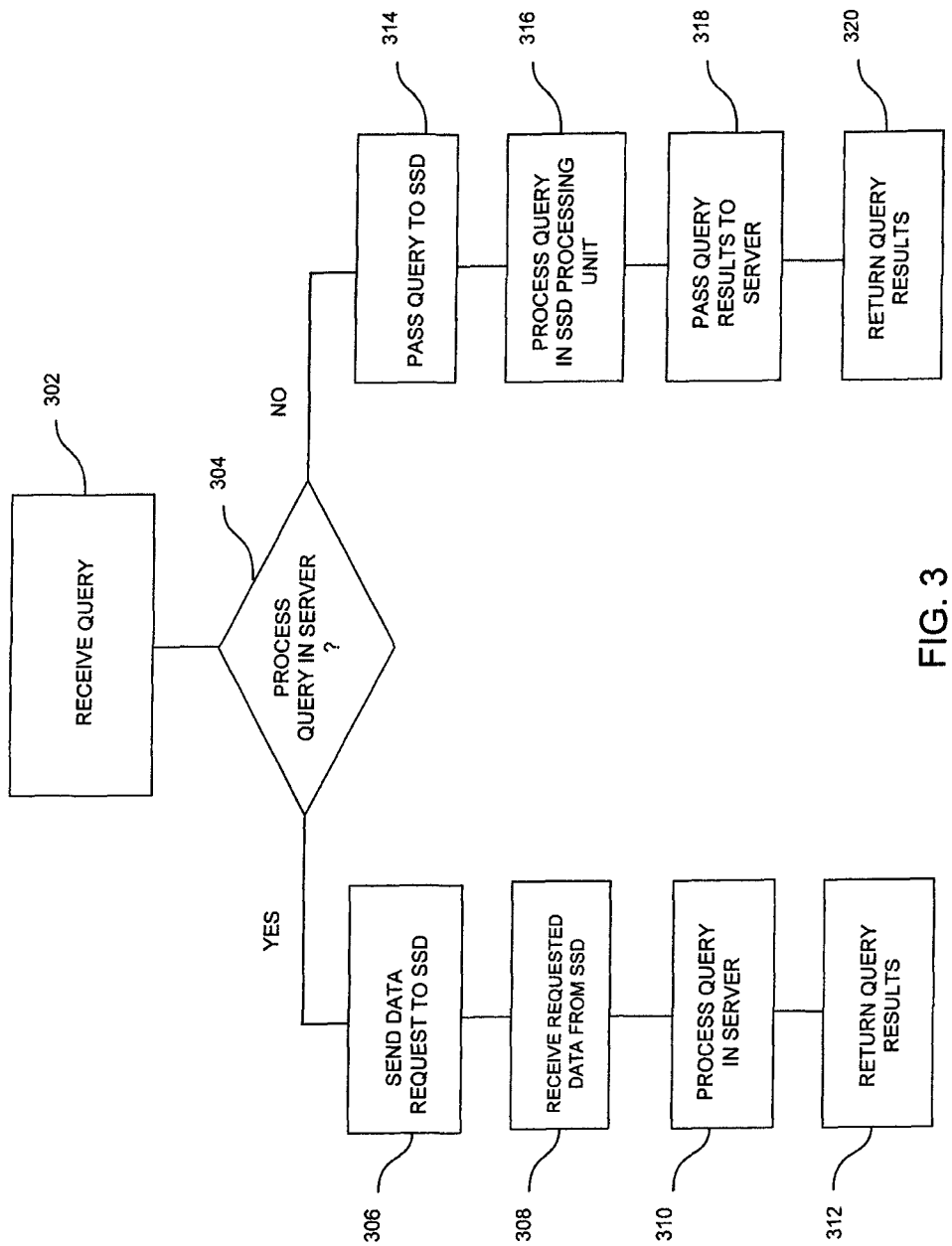
FIG. 3 shows exemplary acts for performing queries in a solid state drive, in accordance with an embodiment of the present invention.

FIG. 3 illustrates a flow diagram of an exemplary method for performing data queries, which may be described by Map-Reduce functions, pursuant to aspects of the present disclosure. Specifically, the system of FIG. 2 receives a query 302 for data. At act 304, the server determines whether the query will be processed in the server or whether it will be passed to the SSD. If the system performs the query in the server, then at act 306, the server sends a data request to the SSD. The server receives the requested data from the SSD at act 308 and processes the query in the server at act 310. Finally, the server returns the query results at act 312.

If the system performs the query in the SSD, then at act 314, the server passes the query to the SSD. The SSD processes the query at act 316 and passes the query results to the server at act 318. Finally, the server returns the query results at act 320. While this process is illustrated with reference to a query, a similar process enables data analytics, pattern matching and searching, and other such operations to be performed on the SSD controller 240.

Figure 4:
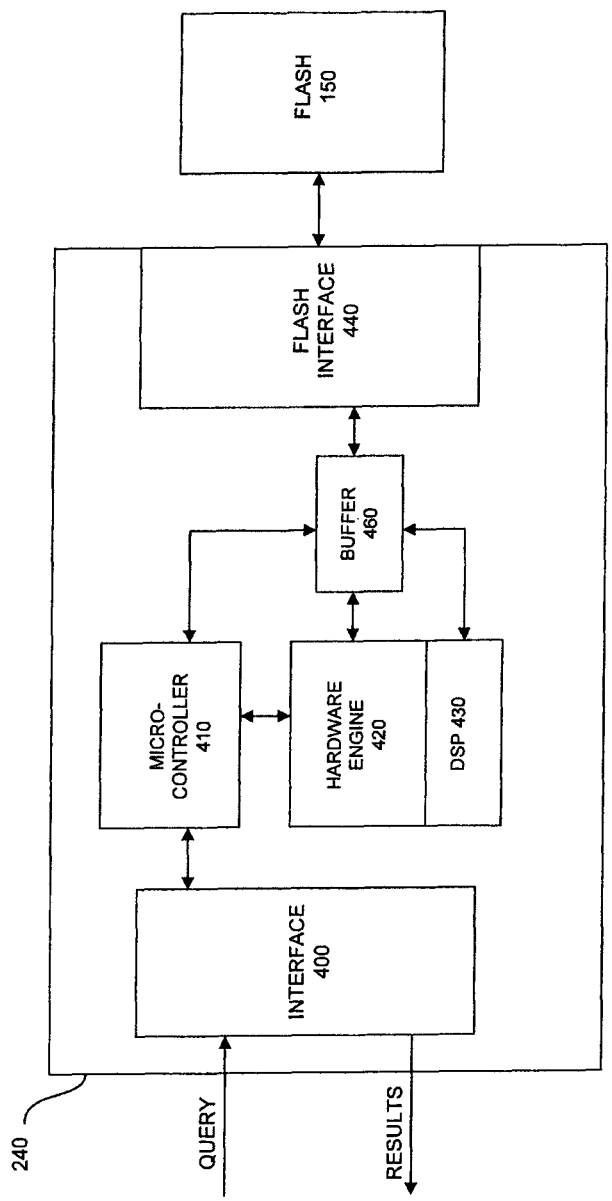
FIG. 4 depicts an exemplary block diagram of a processing unit of a solid state drive in communication with a server and flash memory storage, in accordance with an embodiment of the present invention.

FIG. 4 is a block diagram of an SSD controller 240 according to an embodiment of the present invention. The SSD controller 240 includes a host interface 400, a microcontroller 410, a hardware engine 420, a digital signal processor (DSP) or DSP core 430, a processing unit buffer 460, and a flash interface 440. The host interface 400 may be, for example, PCIe, NVMe, SATA, Fibre Channel, SAS, SCSI over PCIe, or Ethernet. There may be other components on the SSD controller 240 which are not illustrated, such as buffers and the like. The SSD controller 240 communicates with the flash memory 150 through the flash interface 440, which may implement a flash channel interface. In one embodiment, there may be a separate hardware engine 420 for each flash channel; the hardware engine 420 may include a hardware-based search engine. As used herein, a search engine is a digital hardware block designed to test a set of data to determine whether and where it contains matches to a specified pattern. Thus, a comparator implemented in hardware is an example of a search engine, and a more complex search engine may include, among its functional elements, a comparator implemented in hardware. The SSD controller 240 may be a single silicon chip, e.g., a system on a chip (SOC). In one embodiment, the DSP core is a reconfigurable DSP. In one embodiment, the microcontroller 410, the processing unit buffer 460, and the flash interface 440 are all integrated onto a single semiconductor chip (e.g., a single silicon chip), along with a hardware engine 420 or a DSP core 430, or both.

As shown in FIG. 4, the SSD controller 240 may receive a query through the host interface 400. In one embodiment, the microcontroller 410 processes the query by using the hardware engine 420 to compare the requested content of the query with the data on the flash memory 150. The hardware engine 420 may be a hardware-based search engine and may work in conjunction with the DSP 430. In one example the DSP may perform encryption and decryption and the hardware engine may perform searching. The microcontroller 410 returns the results of the query to the server 110' through the host interface 400. In other embodiments, the results of the query or other operation in the intelligent SSD 130 may, instead of being returned to the server CPU 120 or host CPU, be stored in the flash memory 150 or flash memories 150 (FIG. 7), for subsequent retrieval by the server CPU or host CPU.

Figure 5:
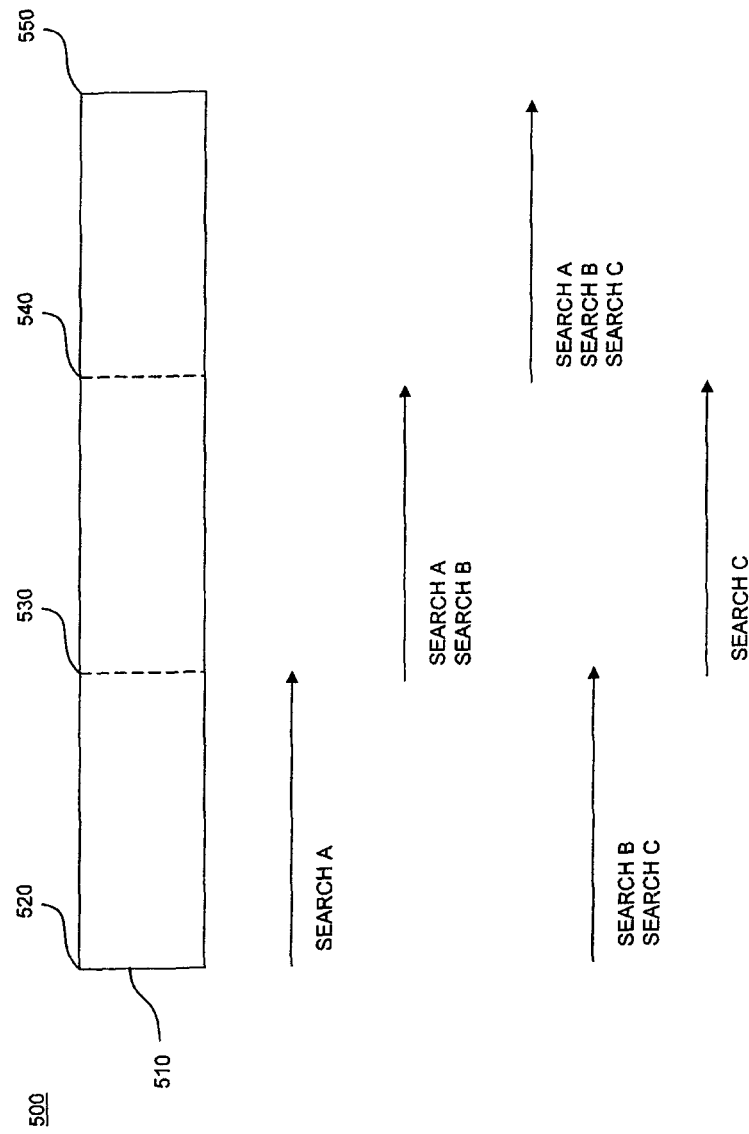
FIG. 5 shows a representation of the storage area of a solid state drive, in relation with searches conducted on the storage area, in accordance with an embodiment of the present invention.

FIG. 5 shows a representation of the storage area of an intelligent SSD 130, in relation with search processes conducted on the storage area, in accordance with an embodiment of the present disclosure. FIG. 5 includes a data storage area 510, which reflects the storage area on the flash memory 150 where data may be located. The server 110' may send queries regularly based on requests it may receive. Once a query, e.g., a request to search for occurrences of a first pattern, is passed to the intelligent SSD 130, the intelligent SSD 130 begins processing it, searching the flash memory 150. If an additional query, related to a second pattern, arrives before the intelligent SSD 130 has completed processing of the initial query, the intelligent SSD 130 may continue to search for the first pattern while simultaneously or concurrently beginning to search for the second pattern. Once it reaches the end of the flash memory 150, the SSD may then start again at the beginning of the flash memory 150, searching for only the second pattern, until it reaches the point in the flash memory 150 at which it received the second query.

A wide range of capabilities may be implemented in a system constructed according to the embodiment illustrated in FIG. 4. For example, if the hardware engine 420 includes a hardware-based search engine, the system may be capable of high-speed, power-efficient searches of the flash memory 150, for example to count the number of occurrences of a string, pattern, or number. The DSP 430 may be used for functions such as encryption of the data written to the flash memory 150 and decryption of the data read from the flash memory 150, or similarly for compression and decompression at write and read respectively, to increase the effective storage capacity of the intelligent SSD 130. In one embodiment an application layer, running for example in the server CPU 120, may perform encryption or compression, and the DSP 430 may decrypt or decompress the data as needed based on the algorithm used in the application layer. The algorithm used by the application layer may be communicated to the DSP by the host CPU. A DSP may also be used for other functions such as in-line indexing, which may be performed when data is written to the flash memory 150, producing an index which may subsequently be used to accelerate search operations of the flash memory 150.

In one embodiment, the intelligent SSD 130 may perform sophisticated analysis including searches and conditional searches. For example a server may have stored in it a very large number of email messages, and a user may wish to find messages satisfying certain criteria, having been sent by a particular sender to any recipient at a particular company. The combination of these two criteria may be tested for by a suitably selected pattern, but if the user wishes to narrow the search further, e.g., with an intelligent search of the body of each email to determine whether a particular transaction was discussed, a more sophisticated algorithm than pattern matching may be required. A conditional search may be used in this example, where criteria related to the body of an email are tested only if an email first meets a first set of criteria, e.g., related to the header of the email; in this case, additional criteria, e.g., a second or third set of criteria related to the body of the email may be added to the search. A system constructed according to the embodiment illustrated in FIG. 4 is suitable for implementing a broad class of analysis algorithms including searches and conditional searches.

In another example as illustrated in FIG. 5, upon receipt of query requiring a first search, referred to as Search A, the process begins reading the data storage area 510 at a storage location 520 and progresses through the data storage area 510. During Search A, while at a storage location 530, a query requiring a second search, referred to as Search B, is received, and the process begins Search B at storage location 530, in addition to continuing Search A at storage location 530. Similarly, Search C is added to the set of simultaneously conducted searches at storage location 540. Search A completes at storage location 550, while Search B and Search C continue at storage location 520. Search B then completes at storage location 530, and Search C completes at storage location 540.

As illustrated in FIG. 5, the search process continues previously initiated searches across the data storage area 510, while simultaneously commencing newly requested searches. The data storage area 510 may be comprised of logical or physical addresses. The addresses may be defined as blocks, pages, sectors, or the like.

Figure 6:
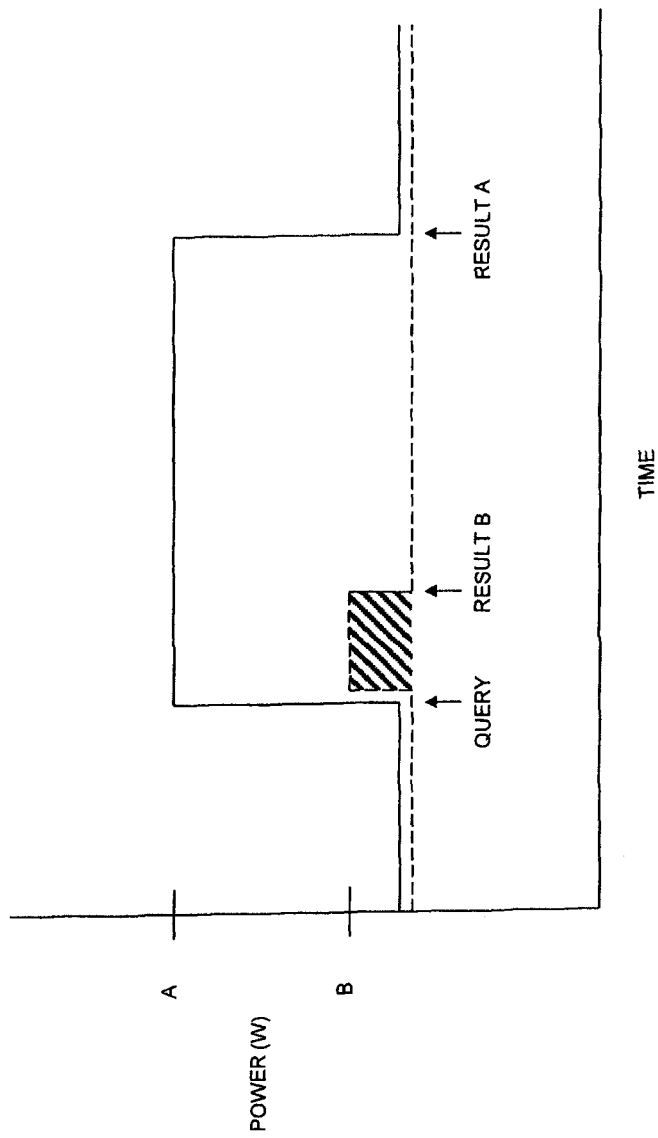
FIG. 6 shows a chart comparing the power usage of an existing system with the power usage of a system employing a storage node constructed according to an embodiment of the present invention, during an exemplary query of a solid state drive.

FIG. 6 shows a chart of the power usage of existing systems in relation to the power usage of a system constructed according to an embodiment of the present invention, for an exemplary query of a solid state drive. The solid line depicts typical power usage when a server processes a query. The dotted line depicts typical power usage when the query is instead performed by the solid state drive 130. Because the server CPU both consumes a higher level of power (level A in FIG. 6) and spends more time processing the query, the energy consumed, i.e., the area under the solid line, is significantly greater than the energy consumed (represented by the cross-hatched area under the dashed line) when the query is processed by the intelligent SSD 130, which consumes power at a lower level (level B in FIG. 6) and completes the processing more quickly.

Figure 7:
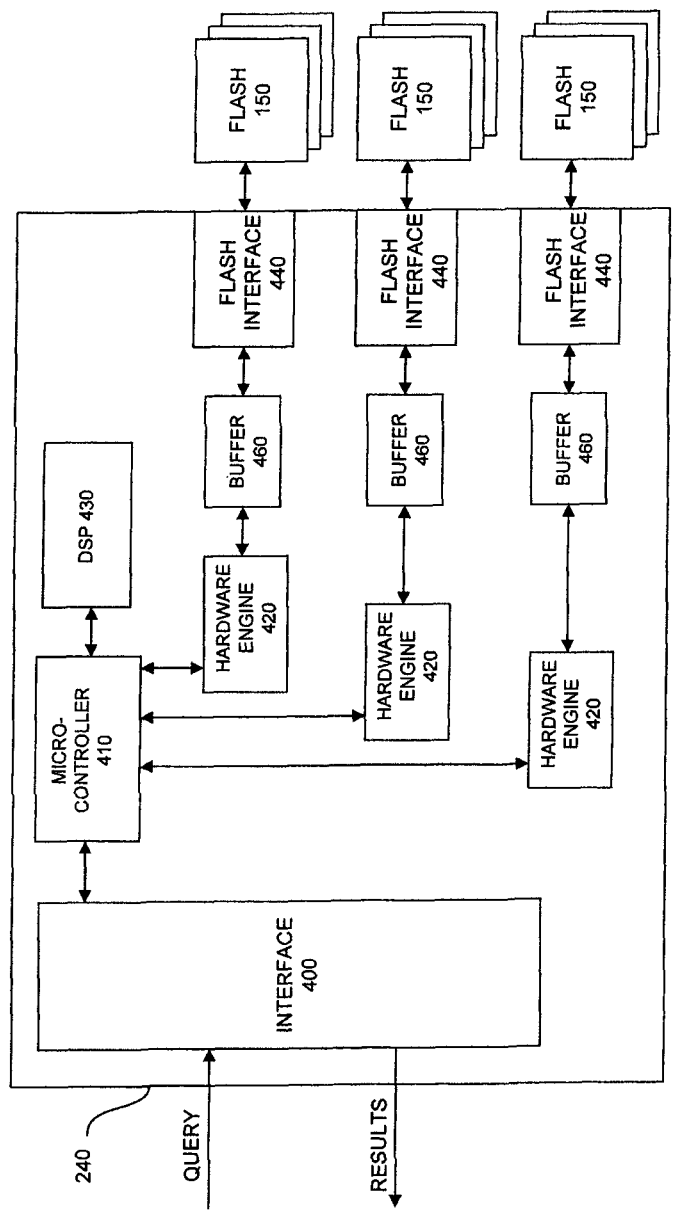
FIG. 7 depicts an exemplary block diagram of a processing unit of a solid state drive in communication with a server and a plurality of flash memories, in accordance with an embodiment of the present invention.

Referring to FIG. 7, in one embodiment of an SSD controller 240, the microcontroller 410 may be connected to a plurality of hardware engines 420, each of which may access a plurality of flash memories 150 through a buffer 460 and a flash interface 440. This structure allows searches to be performed in parallel, resulting in shorter processing times (as illustrated in FIG. 6).

Applications

The disclosed systems and methods have many potential applications, including but not limited to data queries, data analytics, pattern mining, machine learning algorithm, encryption and decryption. While the illustrations above relate to a query, a similar process may be performed, for example, in relation to data analytics, pattern mining, machine learning algorithm, classification, compression and decompression, and encryption and decryption.

There are many alternatives that can be used with these embodiments. For example, while solid state drives (SSDs) were discussed in examples above, any type of suitable memory device, such as a hard disk drive (HDD), can be used. Further, embodiments of the present invention may be used in a redundant array of independent disks (RAID) to achieve similar advantages in optimizing performance and resource utilization, while taking advantage of efficiencies in RAID parity calculations and the number of physical inputs and outputs (I/Os) performed. Accordingly, these embodiments can be used to make RAID controllers and subsystems more efficient.

Other embodiments are within the scope and spirit of the invention. For example, the functionality described above can be implemented using software, hardware, firmware, hardwiring, or combinations of any of these. One or more computer processors operating in accordance with instructions may implement the functions associated with managing use of cache devices in accordance with the present disclosure as described above. If such is the case, it is within the scope of the present disclosure that such instructions may be stored on one or more non-transitory processor readable storage media (e.g., a magnetic disk, non-volatile random-access memory, phase-change memory or other storage medium). Additionally, modules implementing functions may also be physically located at various positions, including being distributed such that portions of functions are implemented at different physical locations.

Figure 8:
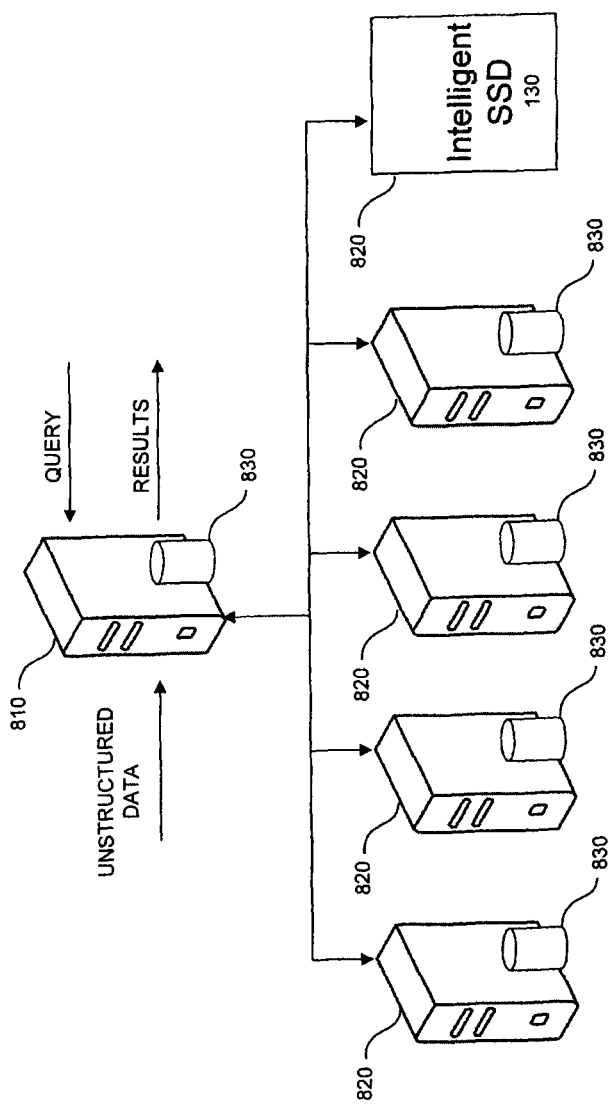
FIG. 8 shows a cluster of nodes in a distributed computing system according to an embodiment of the present invention.

Referring to FIG. 8, in one embodiment, an intelligent SSD 130 containing one or more CPUs is capable of running an operating system on one or more of its CPUs and also of running programs written in high-level languages, e.g., object-oriented languages such as Java™, Python™, or C++. Such programs may describe Map-Reduce functions in a cluster of compute nodes. The cluster may include a master node 810 and a number of slave nodes 820; the master node and the slave nodes may each include or be connected to a storage node 830. Some or all of the storage nodes may be intelligent SSDs 130, and the remainder may be comparable storage nodes such as comparable SSDs or comparable HDDs. The intelligent SSDs 130 may contain hardware accelerated engines to improve the performance of some tasks, for example search.

In one embodiment, the intelligent SSD 130 is part of a data node 820 in the same way as a comparable SSD 125 or other storage node may be part of a data node 820, but it is capable of executing Map-Reduce tasks without transferring the data from the intelligent SSD 130 out to the main CPU. In another embodiment a data node 820' is an intelligent SSD 130 itself, as illustrated by the data node 820' of FIG. 8.

Figure 9:
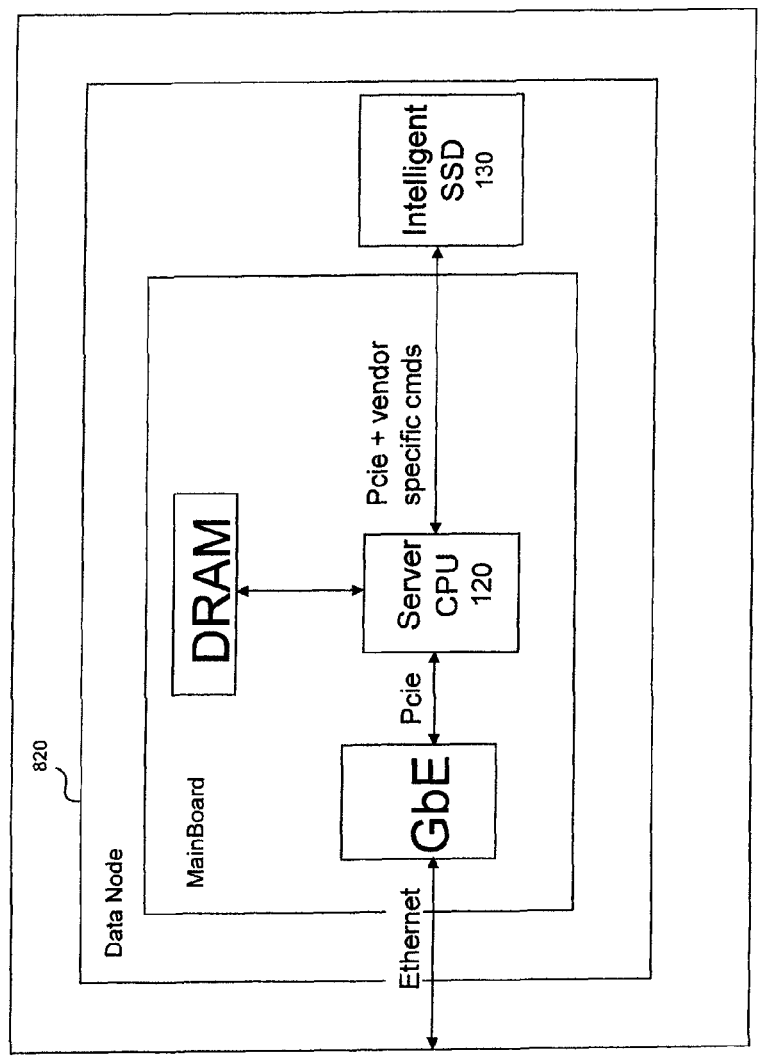
FIG. 9 shows a data node architecture according to an embodiment of the present invention.
Figure 10:
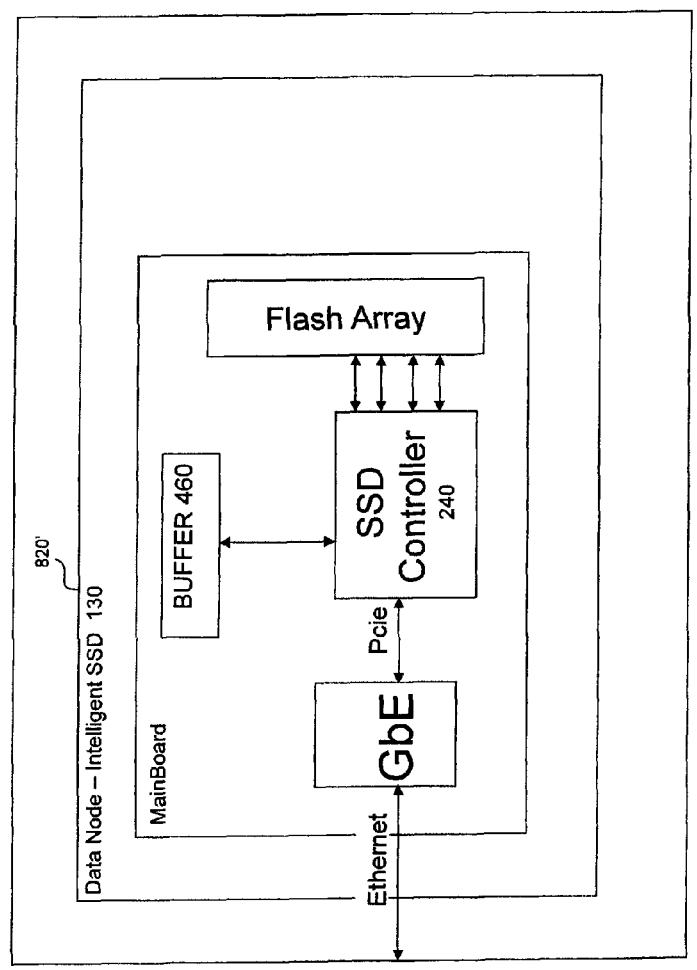
FIG. 10 shows a data node architecture according to another embodiment of the present invention.

These two possibilities are illustrated in FIGS. 9 and 10. Referring to FIG. 9, the data node 820 may have the architecture of a server, with a server CPU 120, DRAM memory, an Ethernet or gigabit Ethernet (GbE) connection for external communications, and a storage node, which, as illustrated, may be an intelligent SSD 130. The intelligent SSD 130 may communicate with the CPU using vendor-specific commands, i.e., commands specified by the vendor of the intelligent SSD 130, which may be executed by the CPU after the installation of appropriate drivers in the data node 820. This embodiment provides value especially in legacy, i.e., existing, installations in which it may be more cost-effective to replace comparable storage nodes with intelligent SSDs 130 when the comparable storage nodes fail, or as performance improvements and power efficiency improvements are needed.

Referring to FIG. 10, in another embodiment, the data node 820' may be the intelligent SSD 130 itself, having an Ethernet, or gigabit Ethernet (GbE), connection for external communications, a buffer 460, an SSD controller 240, and a flash array. The SSD controller 240 may for example include, as shown in FIG. 4, a microcontroller 410, a hardware engine 420, and a DSP 430. This embodiment may be of particular benefit in new installations, in which the use of an intelligent SSD 130 instead of a data node containing a comparable storage node may provide cost savings, in addition to improvements in performance and reductions in power consumption.

Figure 11:
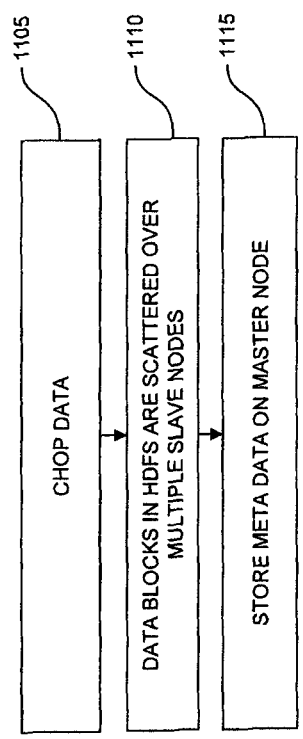
FIG. 11 is a flowchart illustrating acts involved in the storage of unstructured data in a distributed file system according to an embodiment of the present invention.
Figure 12:
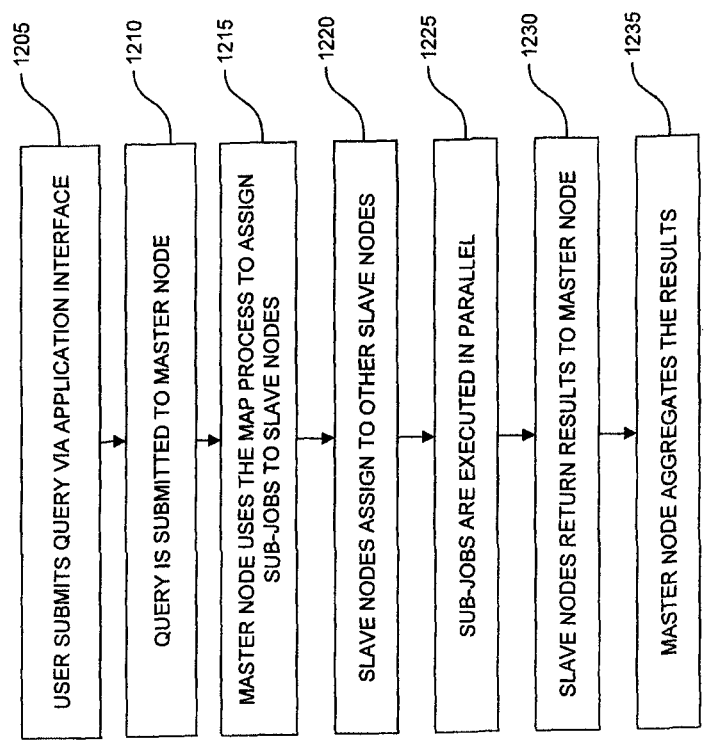
FIG. 12 is a flowchart illustrating acts involved in execution of a query in a distributed file system according to an embodiment of the present invention.

In operation unstructured data is placed on the data nodes via the master node (FIG. 11) and queries are executed on the data using the Map-Reduce framework (FIG. 12). Referring to FIG. 11, in one embodiment, the process of storing unstructured data on the Hadoop™ distributed file system (HDFS) includes three acts. In an act 1105, the data are chopped into multiple data blocks, which are scattered, in an act 1110, over multiple data nodes 820. Metadata for the data blocks are stored, in an act 1115, on the master node. Unstructured data may include social feeds, geographic information systems (GIS) data, documents, extensible markup language (XML), email, web logs, images, audit logs, data from fields sensors, radio frequency identification (RFID) data, data about world events, data about market events, and closed-circuit television (CCTV) footage.

Referring to FIG. 12, the execution of queries involves several acts. In an act 1205, a user submits a query to the system. This may be accomplished through an application interface. In an act 1210, the query is submitted, e.g., by a client machine running the application interface, to the master node 810, which, in an act 1215, uses the map process to assign sub jobs for executing the query to slave nodes 820. Each slave node 820 to which a sub job is assigned by the master node 810 may optionally, in an act 1220, further assign sub jobs to other slave nodes 820. The sub jobs are executed in parallel in an act 1225, the slave nodes 820 return the results to the master node 810 in an act 1230, and the master node 810, in an act 1235, aggregates the results.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein and equivalents thereof.

What is claimed is:

1. An intelligent solid state drive comprising:
a solid state drive controller;
a solid state drive host interface; and
a flash memory;
the solid state drive host interface being selected from the group consisting of: PCIe, NVMe, SATA, Fibre Channel, SAS, SCSI over PCIe, and Ethernet,
the solid state drive controller configured to be in communication with the flash memory, and comprising:
a hardware engine; and
a microcontroller;
the solid state drive configured to:
receive, through the solid state drive host interface, a data query described by Map-Reduce functions;
execute map and reduce tasks, in the solid state drive controller, to process the query; and
return a query result through the solid state drive host interface.

2. The drive of claim 1, wherein the intelligent solid state drive is configured to run an operating system.

3. The drive of claim 2, wherein the operating system is configured to enable the drive to execute a high-level computer language.

4. The drive of claim 3, wherein the computer language is an object-oriented programming language.

5. A distributed computing system, comprising a cluster of nodes,
the cluster of nodes comprising:
a master node; and
a plurality of slave nodes;
wherein a slave node of the plurality of slave nodes comprises a server comprising a server central processing unit (CPU) and the intelligent solid state drive of claim 1.

6. A distributed computing system, comprising a cluster of nodes,
the cluster of nodes comprising:
a master node; and
a plurality of slave nodes;
wherein a slave node of the plurality of slave nodes is the intelligent solid state drive of claim 1.

7. A method of executing a query in a distributed computing system comprising a master node and a plurality of slave nodes, a slave node of the plurality of slave nodes comprising the intelligent solid state drive of claim 1, the method comprising:
submitting the query to the master node;
assigning a plurality of tasks to the plurality of slave nodes, by the master node, the plurality of tasks being configured to execute portions of the query;
executing the plurality of tasks, by the plurality of slave nodes;

returning the results of the execution of the plurality of tasks, by the plurality of slave nodes, to the master node; and aggregating, by the master node, the results of the execution of the plurality of tasks.

8. The method of claim 7, comprising assigning of a task by a first slave node of the plurality of slave nodes to a second slave node of the plurality of slave nodes.

9. The method of claim 7, wherein a task of the plurality of tasks comprises an execution of a map function within a Map-Reduce framework.

10. The method of claim 7, wherein a task of the plurality of tasks comprises an execution of a reduce function within a Map-Reduce framework.

\* \* \* \* \*